United States Patent
Chung et al.

(10) Patent No.: US 8,836,673 B2
(45) Date of Patent: Sep. 16, 2014

(54) PHOTO-SENSOR TYPE INPUT APPARATUS FOR IDENTIFYING DIFFERENT TYPES OF INPUT EVENTS SIMULTANEOUSLY, AND RELATED DISPLAY APPARATUS THEREOF

(75) Inventors: Yueh-Hung Chung, Hsin-Chu (TW); Ya-Ling Hsu, Hsin-Chu (TW); Hsueh-Ying Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 135 days.

(21) Appl. No.: 13/443,900

(22) Filed: Apr. 11, 2012

(65) Prior Publication Data

US 2013/0100078 A1    Apr. 25, 2013

(30) Foreign Application Priority Data

Oct. 24, 2011    (TW) ............... 100138586 A

(51) Int. Cl.
   *G06F 3/042*    (2006.01)
(52) U.S. Cl.
   CPC ..................................... *G06F 3/042* (2013.01)
   USPC ....................................................... 345/175
(58) Field of Classification Search
   USPC ....................................................... 348/294
   See application file for complete search history.

(56) References Cited

U.S. PATENT DOCUMENTS

| | | | |
|---|---|---|---|
| 2005/0200293 A1 | 9/2005 | Naugler | |
| 2007/0080282 A1 | 4/2007 | Fann | |
| 2010/0020044 A1* | 1/2010 | Abileah et al. | 345/175 |
| 2010/0156847 A1* | 6/2010 | No et al. | 345/175 |
| 2010/0315377 A1 | 12/2010 | Chang | |
| 2011/0001711 A1* | 1/2011 | Choi et al. | 345/173 |

FOREIGN PATENT DOCUMENTS

| | | |
|---|---|---|
| CN | 101943974 A | 1/2011 |
| EP | 2199891 A2 | 6/2010 |
| TW | 200715576 | 4/2007 |

* cited by examiner

*Primary Examiner* — Kent Chang
*Assistant Examiner* — Nathan Brittingham
(74) *Attorney, Agent, or Firm* — Winston Hsu; Scott Margo

(57) ABSTRACT

A photo-sensor type input apparatus includes an upper substrate, a bottom substrate, at least one first photo sensing device, and at least one second photo sensing device. The bottom substrate is correspondingly disposed below the upper substrate. The first photo sensing device is disposed on the bottom substrate and arranged to detect a received first type input event. The second photo sensing device is disposed on the bottom substrate and arranged to detect a received second type input event. A light sensing ability of the first photo sensing device is different from a light sensing ability of the second photo sensing device.

19 Claims, 13 Drawing Sheets

| LS1 | LS1 | LS1 | LS1 |
|---|---|---|---|
| LS2 | LS2 | LS2 | LS2 |
| LS1 | LS1 | LS1 | LS1 |
| LS2 | LS2 | LS2 | LS2 |

Arrangement 1

| LS1 | LS2 | LS1 | LS2 |
|---|---|---|---|
| LS2 | LS1 | LS2 | LS1 |
| LS1 | LS2 | LS1 | LS2 |
| LS2 | LS1 | LS2 | LS1 |

Arrangement 2

FIG. 8A

| R | R | R | R |
|---|---|---|---|
| G | G | G | G |
| W | W | W | W |
| B | B | B | B |

Arrangement 1

| R | G | R | G |
|---|---|---|---|
| G | R | G | R |
| B | W | B | W |
| W | B | W | B |

Arrangement 2

FIG. 8B

| LS1 | LS1 | LS1 | LS1 | Odd frame |
| --- | --- | --- | --- | --- |
| LS2 | LS2 | LS2 | LS2 | Even frame |
| LS1 | LS1 | LS1 | LS1 | Odd frame |
| LS2 | LS2 | LS2 | LS2 | Even frame |

PHOTO-SENSOR TYPE INPUT APPARATUS FOR IDENTIFYING DIFFERENT TYPES OF INPUT EVENTS SIMULTANEOUSLY, AND RELATED DISPLAY APPARATUS THEREOF

BACKGROUND OF THE INVENTION

1. Field of the Invention

The disclosed embodiments of the present invention relate to input apparatus, and more particularly, to a photo-sensor input apparatus capable of successfully detecting a touch event generated by a light pen as well as a touch event generated by a finger, and related display apparatus thereof.

2. Description of the Prior Art

An in-cell photo-sensor type touch apparatus determines if a touch input event has been detected based on the fact that a thin film transistor (TFT) photo sensor generates different photo currents in response to different light intensities. Please refer to FIG. 1A, which is a diagram illustrating a photocurrent Id generated from a TFT photo sensor 110 of a conventional photo-sensor type touch apparatus 100 in response to illumination. As shown in FIG. 1A, when the TFT photo sensor 110 is biased at a proper gate-to-source voltage Vgs, photoelectrons generated from the TFT photo sensor 110 due to the illumination may flow from the TFT photo sensor 110 to a capacitor 120 coupled between a voltage Va and a reference voltage node Vr. In other words, the photocurrent Id flows from the capacitor 120 to the TFT photo sensor 110, which causes variations in the voltage Va before and after the illumination. Therefore, the photo-sensor type touch apparatus 100 may enable a readout TFT 130 to read out a voltage variation value Vout of the voltage Va, thus allowing the backend circuits (not shown in FIG. 1A) to detect the touch input event.

Please refer to FIG. 1B and FIG. 1C together. FIG. 1B is a diagram illustrating different leakage currents Ids (i.e., the photocurrent Id at zero gate-to-source voltage Vgs) generated from the TFT photo sensor 110 without the applied gate-to-source voltage Vgs in cases where the photo-sensor type touch apparatus 100 is touched by a finger, illuminated by ambient light, and touched by a light pen. FIG. 1C is a diagram illustrating the relation between the photocurrent Id generated in various manners as shown in FIG. 1B and the gate-to-source voltage Vgs. As shown in FIG. 1B, in a case where an upper substrate 140 of the photo-sensor type touch apparatus 100 is touched by the finger, part of the ambient light is shielded. Therefore, the light intensity received by the TFT photo sensor 110 (disposed on a bottom substrate 150) is weaker as compared with a case where the TFT photo sensor 110 is illuminated by the ambient light, which is shown by the arrow L1 having a width narrower than that of the arrow L2. The leakage current Id_a generated by the finger touch is thus smaller than the leakage current Id_b generated by the ambient light illumination. In another case where the photo-sensor type touch apparatus 100 is touched by the light pen, the light intensity received by the TFT photo sensor 110 is enhanced, which is shown by the arrow L3 having a width wider than that of the arrow L2. The leakage current Id_c generated by the light pen is thus higher than the generated leakage current Id_b. Ideally, as shown in FIG. 1C, by setting the gate-to-source voltage Vgs properly, the TFT photo sensor 110 is allowed to identify an input event triggered by the light pen touch and an input event triggered by the finger touch, simultaneously. However, due to certain factors such as the unstable ambient light, it is much difficult to find a voltage setting for identifying input events triggered by the finger touch, the ambient light illumination, and the light pen touch, simultaneously.

Please refer to FIG. 2A, which is a diagram illustrating the relation between the voltage signal intensities generated due to the illumination and the corresponding positions of TFT photo sensors in a photo-sensor type touch apparatus. Ideally, as shown in FIG. 2A, a difference level between the voltage signal generated by the light pen touch and the voltage signal generated by the finger touch as well as another difference level between the voltage signal generated by the finger touch and the voltage signal generated by the ambient light illumination are sufficient for the backend circuit to perform touch event detection. However, the ambient light level would change actually, and thus one of the above two difference levels is too small, which makes the photo-sensor type touch apparatus fail to detect touch input events (i.e., the input events triggered by the light pen touch and the finger touch) simultaneously. Please refer to FIG. 2B, which is a diagram illustrating the relation between the voltage intensity and the position in a case where the voltage (i.e., the gate-to-source voltage Vgs) of the TFT photo sensor is set properly for detecting the input event triggered by the light pen touch. As shown in FIG. 2B, it is difficult to identify voltage signals generated by the finger touch. Please refer to FIG. 2C, which is a diagram illustrating the relation between the voltage intensity and the position in a case where the voltage (i.e., the gate-to-source voltage Vgs) of the TFT photo sensor is set properly for detecting the input event triggered by the finger touch. Similarly, as shown in FIG. 2C, it is difficult to identify voltage signals generated by the light pen touch.

Thus, there is a need for an innovative photo-sensor type touch apparatus to solve the problem of identifying different types of input events (e.g., the input events triggered by the finger and the light pen).

SUMMARY OF THE INVENTION

In accordance with exemplary embodiments of the present invention, a photo-sensor type input apparatus having photo sensing devices dedicated to a first type input event (e.g., an illumination touch event triggered by a light pen) as well as photo sensing devices dedicated to a second type input event (e.g., a shadow touch event triggered by a finger) is proposed to solve the above-mentioned problem, thereby improving the reliability of signal identification and making the mass production much easier.

According to an embodiment of the present invention, an exemplary photo-sensor type input apparatus is disclosed. The exemplary photo-sensor type input apparatus includes an upper substrate, a bottom substrate, at least one first photo sensing device, and at least one second photo sensing device. The bottom substrate is correspondingly disposed below the upper substrate. The first photo sensing device is disposed on the bottom substrate and arranged for detecting a received first type input event. The second photo sensing device is disposed on the bottom substrate and arranged for detecting a received second type input event. A light sensing ability of the first photo sensing device is different from a light sensing ability of the second photo sensing device.

According to another embodiment of the present invention, an exemplary display apparatus is disclosed. The exemplary display apparatus includes an upper substrate, a bottom substrate, at least one display unit, at least one first photo sensing device, and at least one second photo sensing device. The bottom substrate is correspondingly disposed below the upper substrate. The display unit is disposed on the bottom substrate. The first photo sensing device is disposed on the bottom substrate and arranged for detecting a received first type input event. The second photo sensing device is disposed on the bottom substrate and arranged for detecting a received second type input event. A light sensing ability of the first photo sensing device is different from a light sensing ability of the second photo sensing device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8A is a diagram illustrating a plurality of first and second photo sensing devices arranged on the bottom substrate according to an embodiment of the present invention.

FIG. 8B is a diagram illustrating a plurality of first and second photo sensing devices arranged on the bottom substrate according to an embodiment of the present invention.

DETAILED DESCRIPTION

Figure 1A:
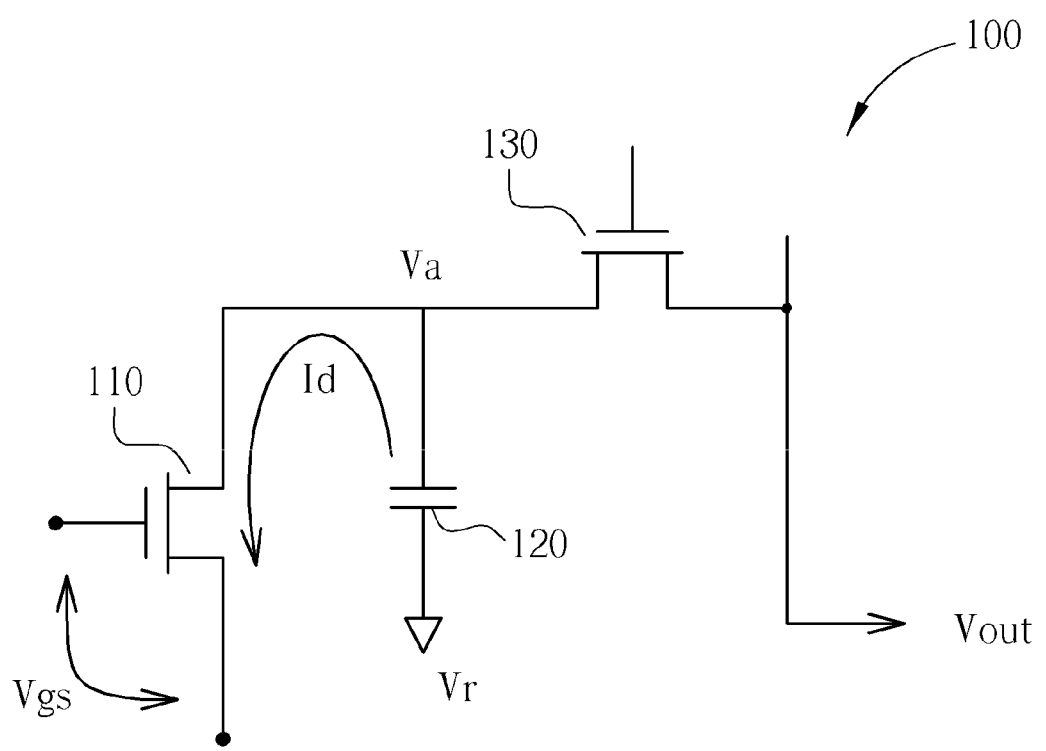
FIG. 1A is a diagram illustrating a photocurrent generated from a TFT photo sensor of a conventional photo-sensor type touch apparatus in response to illumination.
Figure 1B:
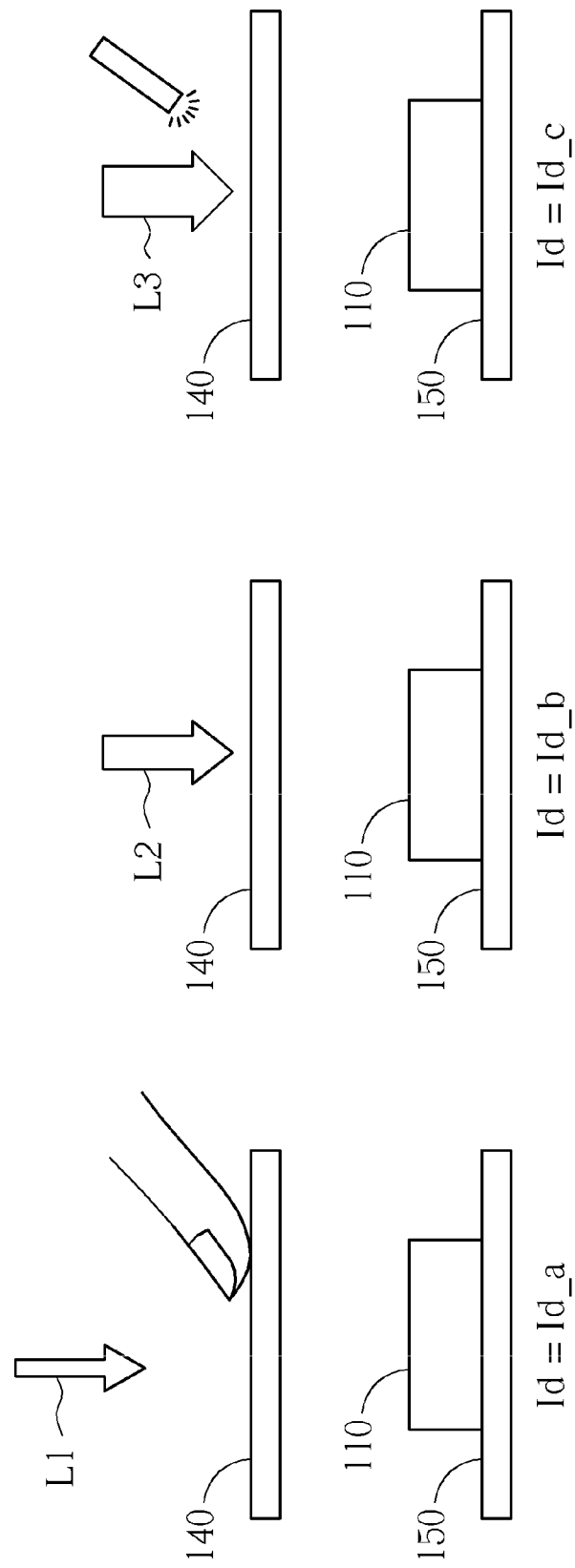
FIG. 1B is a diagram illustrating different leakage currents generated from the TFT photo sensor without the applied gate-to-source voltage in cases where the photo-sensor type touch apparatus is touched by a finger, illuminated by ambient light, and touched by a light pen.
Figure 1C:
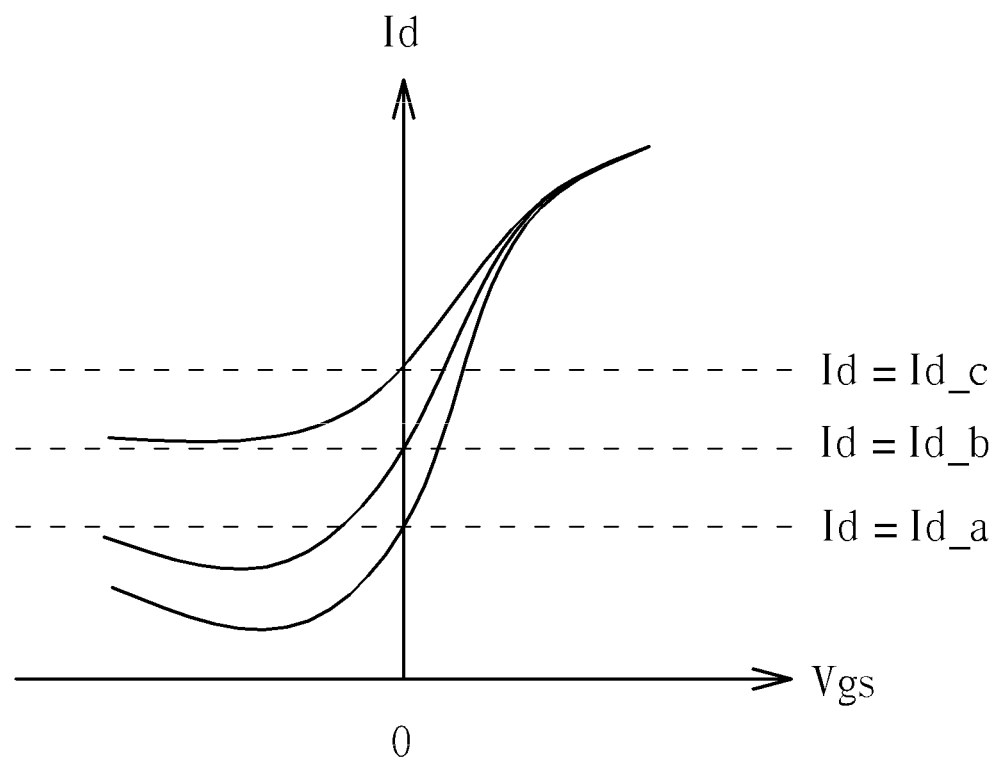
FIG. 1C is a diagram illustrating the relation between the photocurrent generated in various manners as shown in FIG. 1B and the gate-to-source voltage.
Figures 2A, 2B, 2C:
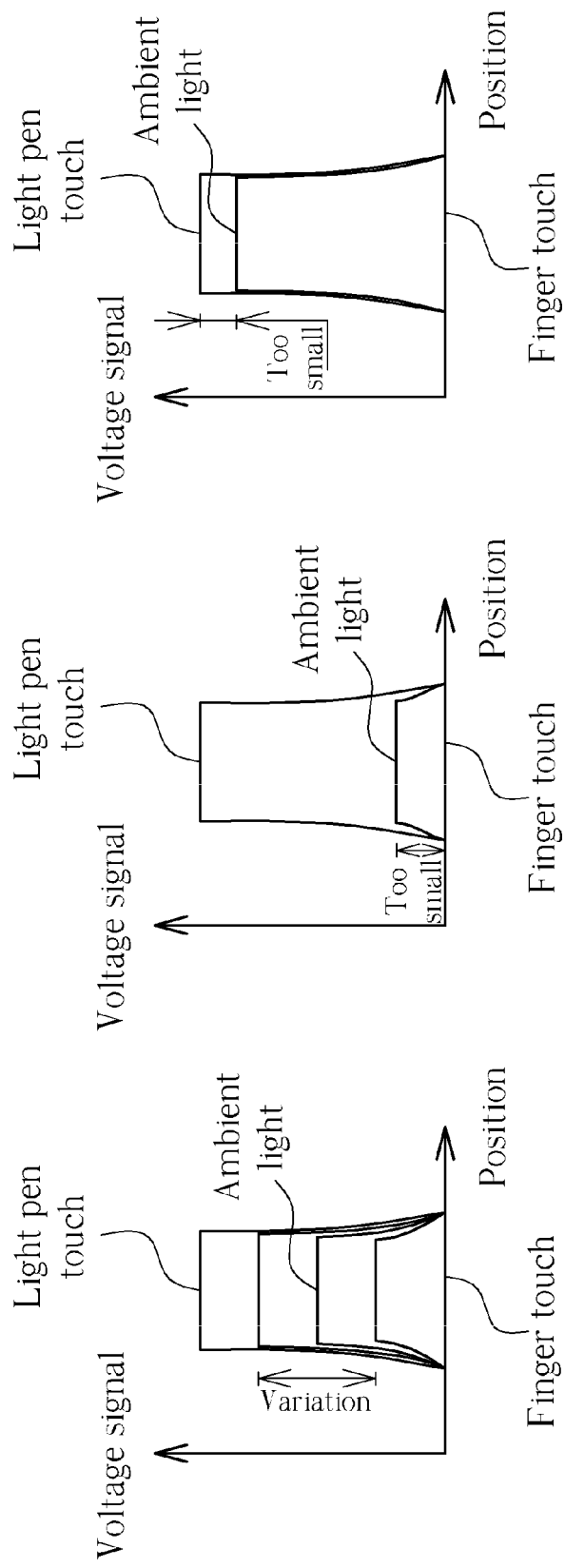
FIG. 2A is a diagram illustrating the relation between the voltage signal intensities generated due to the illumination and the corresponding positions of TFT photo sensors in a photo-sensor type touch apparatus.
FIG. 2B is a diagram illustrating the relation between the voltage intensity and the position in a case where the voltage of the TFT photo sensor is set properly for detecting the input event triggered by the light pen touch.
FIG. 2C is a diagram illustrating the relation between the voltage intensity and the position in a case where the voltage of the TFT photo sensor is set properly for detecting the input event triggered by the finger touch.
Figure 3:
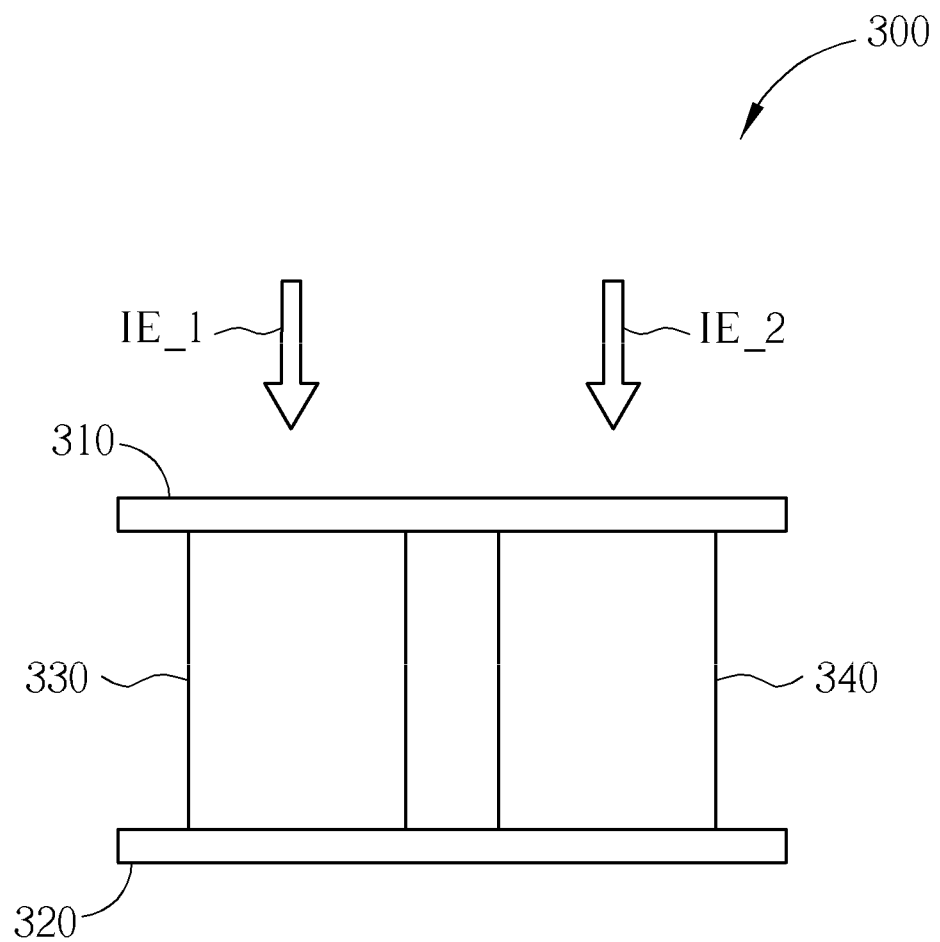
FIG. 3 is a diagram illustrating a generalized photo-sensor type input apparatus according to an embodiment of the present invention.

Please refer to FIG. 3, which is a diagram illustrating a generalized photo-sensor type input apparatus 300 according to an embodiment of the present invention. The exemplary photo-sensor type input apparatus 300 includes, but is not limited to, an upper substrate 310, a bottom substrate 320, at least one first photo sensing device 330, and at least one second photo sensing device 340. The bottom substrate 320 is correspondingly disposed below the upper substrate 310. The first photo sensing device 330 is disposed on the bottom substrate 320 and dedicated to detecting a received first type input event IE_1. The second photo sensing device 340 is disposed on the bottom substrate 320 and dedicated to detecting a received second type input event IE_2, wherein a light sensing ability of the first photo sensing device 330 is different from a light sensing ability of the second photo sensing device 340. By way of example, but not limitation, the first type input event IE_1 and the second type input event IE_2 may be two kinds of different trigger-type input events, such as an illumination touch event triggered by a light-emitting object (e.g., a light pen) illuminating the photo-sensor type input apparatus 300, and a shadow touch event triggered by a light-shielding object (e.g., a finger) touching the photo-sensor type input apparatus 300. In addition, it is the design manner of the photo sensing device, rather than process variation between the sensing devices of the same type, that causes a difference between the light sensing ability of the first photo sensing device 330 and the light sensing ability of the second photo sensing device 340. For example, factors affecting the light sensing ability of the first photo sensing device 330 include, but are not limited to, transmittance between a sensing circuit (not shown in FIG. 3) of the first photo sensing device 330 and the upper substrate 310, a circuit design of the sensing circuit included in the first photo sensing device 330, and a driving setting of the sensing circuit included in the first photo sensing device 330. Based on the above three factors affecting the light sensing ability, the present invention is further described with reference to the following examples.

Figure 4A:
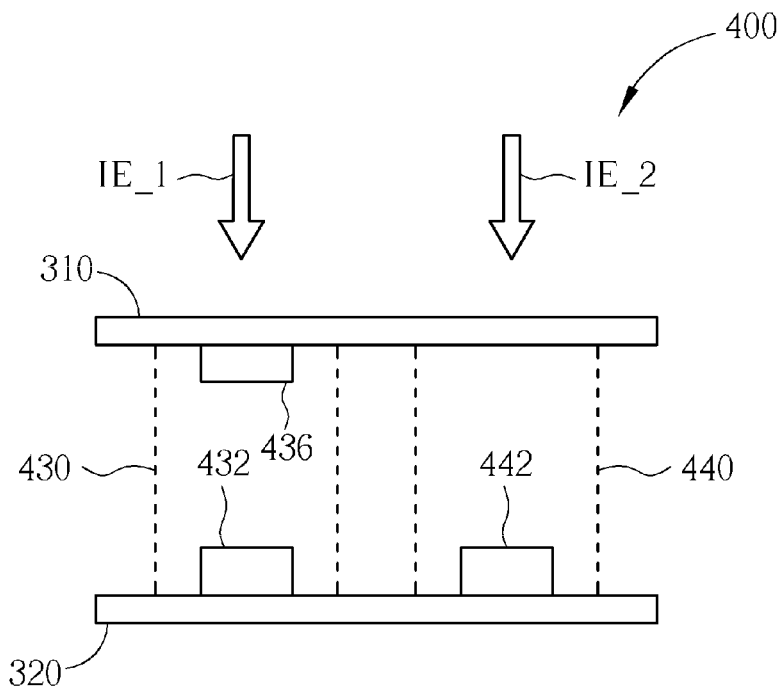
FIG. 4A is a diagram illustrating an exemplary photo sensor type input apparatus according to an embodiment of the present invention.

Please refer to FIG. 4A, which is a diagram illustrating an exemplary photo sensor type input apparatus according to an embodiment of the present invention. The architecture of the photo sensor type input apparatus 400 is based on the generalized photo sensor type input apparatus 300, and therefore includes the upper substrate 310 and the bottom substrate 320 shown in FIG. 3, a first photo sensing device 430, and a second photo sensing device 440, wherein transmittance between a sensing circuit of the first photo sensing device 430 and the upper substrate 310 is different from transmittance between a sensing circuit of the second photo sensing device 440 and the upper substrate 310. To put it another way, a light sensing ability of the first photo sensing device 430 is different from a light sensing ability of the second photo sensing device 440. In this embodiment shown in FIG. 4A, each first photo sensing device included in the photo sensor type input apparatus 400 (i.e., the first photo sensing device 430) includes, but is not limited to, a first sensing circuit 432 and a filter set 436. The first sensing circuit 432 is used for detecting the first type input event IE_1 (e.g., an illumination touch event triggered by a light-emitting object). The filter set 436 is disposed between the first sensing circuit 432 and the upper substrate 310, wherein the filter set 436 has at least one filter. In addition, each second photo sensing device included in the photo sensor type input apparatus 400 (i.e., the second photo sensing device 440) includes, but is not limited to, a second sensing circuit 442. The second sensing circuit 442 is used for detecting the second type input event IE_2 (e.g., a shadow touch event triggered by a light-shielding object), and there is no filter disposed between the second sensing circuit 442 and the upper substrate 310. For example, please refer to FIG. 4B, which is a diagram illustrating the respective relations between the biased gate-to-source voltage Vgs and the voltage signal Vo generated due to illumination for the first and second photo sensing devices 430 and 440 according to an exemplary implementation of the present invention. In this exemplary implementation shown in FIG. 4B, the filter set of each first photo sensing device included in the photo sensor type input apparatus 400 is one of a red filter R, a green filter G, and a blue filter B, while no filter (denoted as W) is disposed between a sensing circuit of each second sensing circuit 442 included in the photo sensor type input apparatus 400 and the upper substrate 310. As there is no red, green, or blue filter disposed between the sensing circuit of each second photo sensing device and the upper substrate 310, the transmittance therebetween is about three times the transmittance between the sensing circuit of the first photo sensing device and the upper substrate 310 in the photo sensor type input apparatus 400. Therefore, a proper bias range VE may be obtained to make each of the first and second photo sensing devices 430 and 440 successfully detect the first type input event IE_1 and the type input event IE_2, respectively. In an alternative design, the filter set 436 may have a plurality of different kinds of filters. By way of example, but not limitation, the plurality of filters may include two filter layers composed of a red filter R and a blue filter B overlapping with each other.

Figure 5:
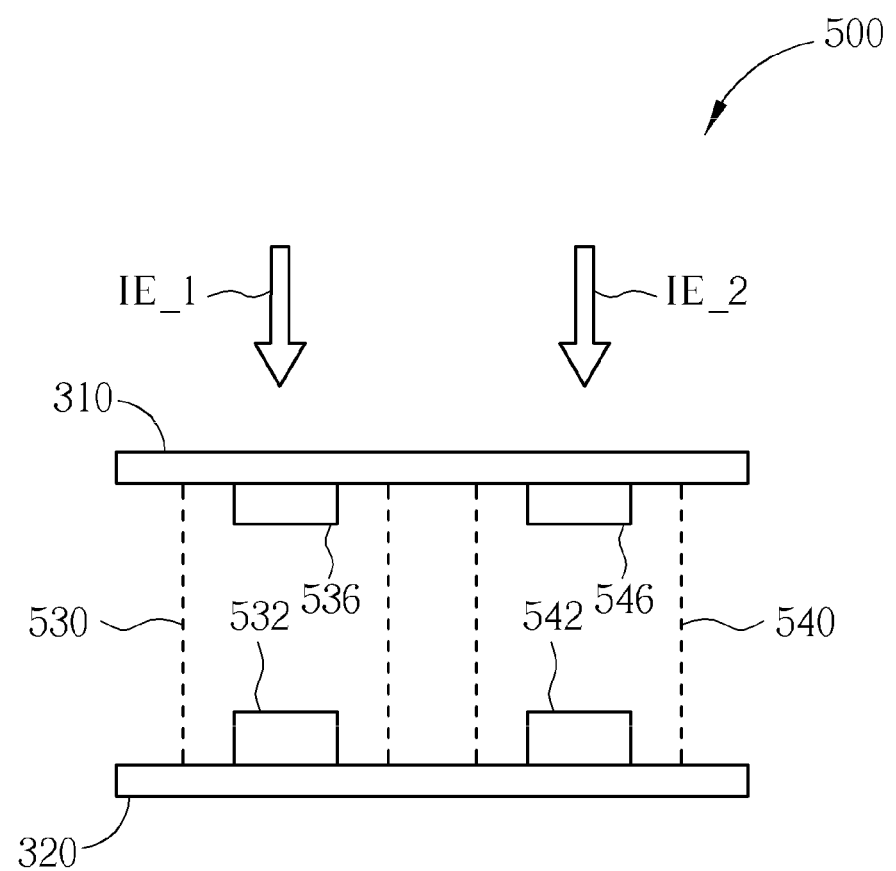
FIG. 5 is a diagram illustrating another exemplary photo sensor type input apparatus according to another embodiment of the present invention.

Please refer to FIG. 5, which is a diagram illustrating another exemplary photo sensor type input apparatus according to another embodiment of the present invention. The architecture of the photo sensor type input apparatus 500 is based on the generalized photo sensor type input apparatus 300 shown in FIG. 3, and therefore includes the upper substrate 310 and the bottom substrate 320 shown in FIG. 3, a first photo sensing device 530, and a second photo sensing device 540, wherein transmittance between a sensing circuit of the first photo sensing device 530 and the upper substrate 310 is different from transmittance between a sensing circuit of the second photo sensing device 540 and the upper substrate 310. To put it another way, a light sensing ability of the first photo sensing device 530 is different from a light sensing ability of the second photo sensing device 540. In this embodiment, each first photo sensing device included in the photo sensor type input apparatus 500 (i.e., the first photo sensing device 530) includes, but is not limited to, a first sensing circuit 532 and a first filter set 536. The first sensing circuit 532 is used for detecting the first type input event IE_1 (e.g., an illumination touch event triggered by a light-emitting object). The first filter set 536 is disposed between the first sensing circuit 532 and the upper substrate 310, wherein the first filter set 536 has at least one filter. Each the second photo sensing device included in the photo sensor type input apparatus 500 (i.e., the second photo sensing device 540) includes, but is not limited to, a second sensing circuit 542 and a second filter set 536. The second sensing circuit 542 is used for detecting the second type input event IE_2 (e.g., a shadow touch event triggered by a light-shielding object). The second filter set 546 is disposed between the second sensing circuit 542 and the upper substrate 310, wherein the second filter set 546 has at least one filter, and transmittance of the second filter set 546 is different from transmittance of the first filter set 536.

For example, the second filter set 546 of the second photo sensing device 540 dedicated to detecting the second type input event IE_2 has filter(s) with high transmittance, such as white filter(s) or dichroic filter(s). In an alternative design, at least one of the first filter set 536 and the second filter set 546 has a plurality of different kinds of filters. By way of example, but not limitation, as long as the transmittance between the first sensing circuit 532 and the upper substrate 310 is sufficiently different from that between the second sensing circuit 542 and the upper substrate 310, both of the first filter set 536 and the second filter set 546 may include a plurality of filters having more than two kinds of colors or transmittances. It should be noted that, for illustrative purposes, a sensing circuit design of each first photo sensing device is the same as a sensing circuit design of each second sensing circuit in the photo sensor type input apparatus 400 shown in FIG. 4, and so is in the photo sensor type input apparatus 500 shown in FIG. 5. That is, in a same photo sensor type input apparatus, what makes the difference in light sensing abilities between the first and second photo sensing devices is that the transmittance between the sensing circuit of each first photo sensing device and the corresponding upper substrate is different from the transmittance between the sensing circuit of each second photo sensing device and the corresponding upper substrate. However, this is for illustrative purposes only, and is not meant to be a limitation of the present invention. For example, circuit designs of the first sensing circuits 532 and 432 may be identical to or different from circuit designs of the second sensing circuits 542 and 442, respectively. Further description is detailed as follows.

Figure 4B:
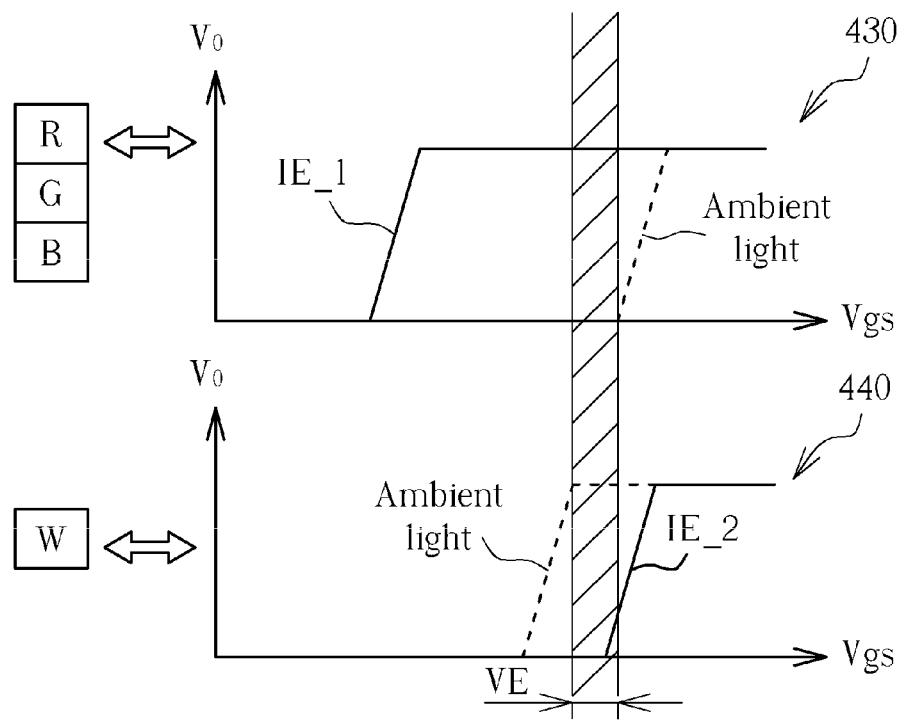
FIG. 4B is a diagram illustrating the respective relations between the biased gate-to-source voltage and the voltage signal generated due to illumination for the first and second photo sensing device according to an exemplary implementation of the present invention.
Figure 6A:
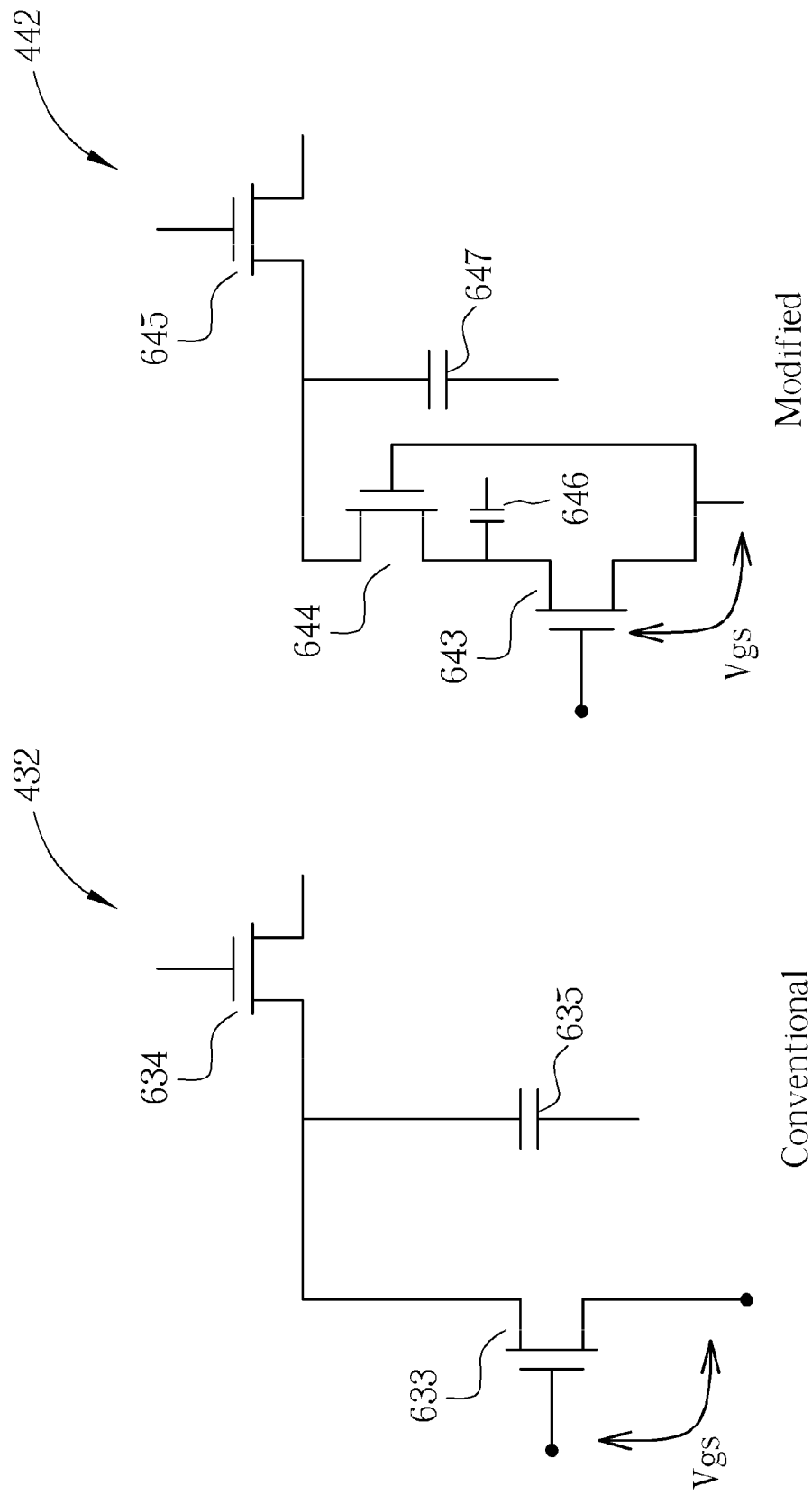
FIG. 6A is a diagram illustrating circuit designs of the first and the second sensing circuits in the photo sensor type input apparatus shown in FIG. 4.
Figure 6B:
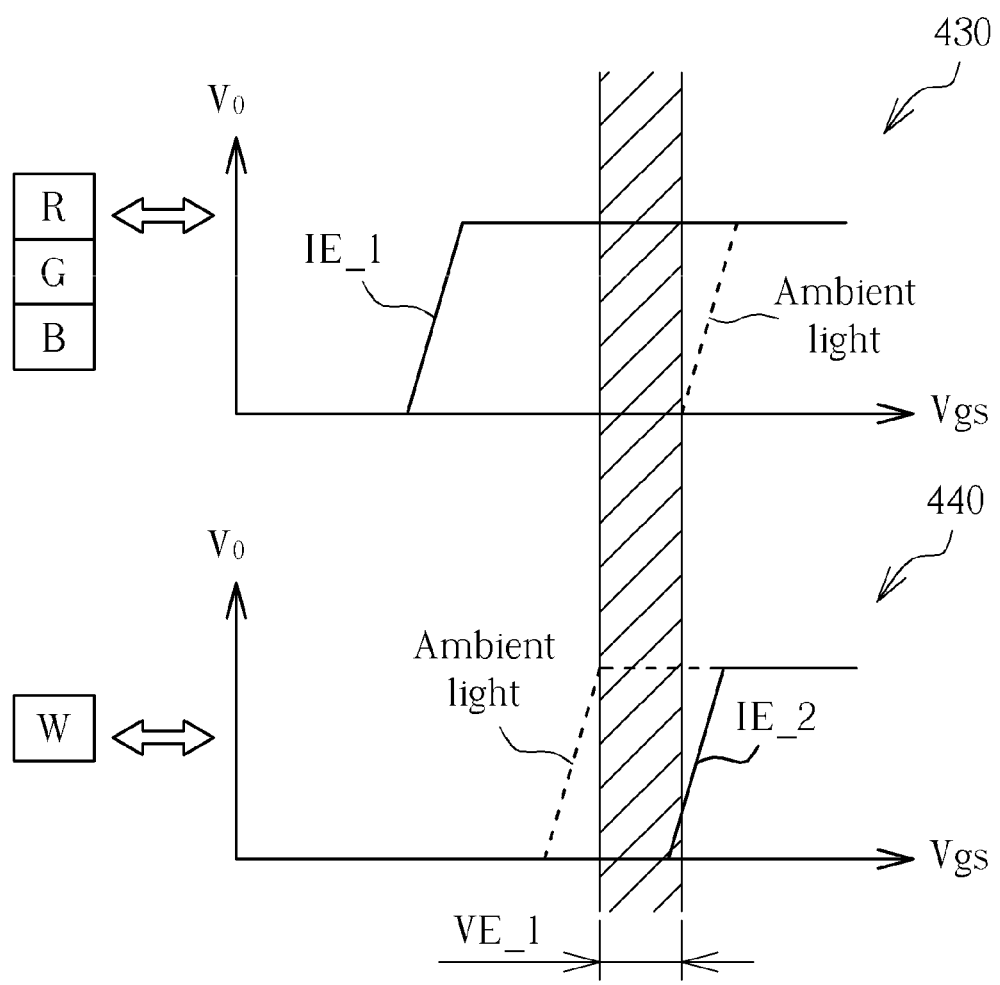
FIG. 6B is a diagram illustrating the respective relation between the biased gate-to-source voltage and the voltage signal generated due to illumination for the first and second photo sensing devices shown in FIG. 4A employing the sensing circuit designs shown in FIG. 6A.

Please refer to FIG. 6A, which is a diagram illustrating circuit designs of the first sensing circuit 432 and the second sensing circuit 442 in the photo sensor type input apparatus 400 shown in FIG. 4. In this embodiment, the first sensing circuit 432 employs a conventional passive pixel sensor (PPS) design, and therefore includes a first transistor 633, a second transistor 634, and a capacitor 635. As a person skilled in the pertinent art can readily understand the operation of the above sensing circuit design, further description is omitted here for brevity. The second sensing circuit 442 employs a modified pixel sensor design, and includes a first transistor 643, a second transistor 644, a third transistor 645, a first capacitor 646, and a second capacitor 647. As shown in FIG. 6A, the first transistor 643 is coupled to the second transistor 644 in series, which makes the leakage current corresponding to the first transistor 643 smaller than the leakage current corresponding to the first transistor 633. Therefore, difference between the voltage outputs before and after illumination may be increased by employing the modified pixel sensor design (i.e., the light sensing ability of the second sensing circuit 442 is higher than that of the first sensing circuit 432). Please refer to FIG. 6B, which is a diagram illustrating the respective relation between the biased gate-to-source voltage Vgs and the voltage signal Vo generated due to illumination for the first and second photo sensing devices 430 and 440 shown in FIG. 4A where the sensing circuit designs shown in FIG. 6A are employed therein. As shown in FIG. 6B, in this embodiment, besides the use of the above-mentioned design manner that the first photo sensing device 430 has the filter set 436 while no filter is disposed between the sensing circuit of the second sensing circuit 442 and the upper substrate 310, the sensing circuit of the first photo sensing device 430 employs the conventional PPS design shown in FIG. 6A, and the second photo sensing device 440 employs the modified pixel sensor design shown in FIG. 6A. Thus, the light sensing ability of the second photo sensing device 440 may be further enhanced, and the obtained proper bias range VE1 is larger than the proper bias range VE shown in FIG. 4B.

Please note that the above is for illustrative purposes only, and is not meant to be a limitation of the present invention. For example, even if the difference between the first and second photo sensing devices 330 and 340 shown in FIG. 3 results from different circuit designs, the aforementioned first and second type input events may be detected successfully by the first and second photo sensing devices 330 and 340, respectively, as long as sensing circuits of the first and second photo sensing devices 330 and 340 are designed in different manners to provide the sufficient difference in light sensing abilities therebetween for obtaining a proper bias range from the respective relations between the gate-to-source voltage and the voltage output.

Figure 7:
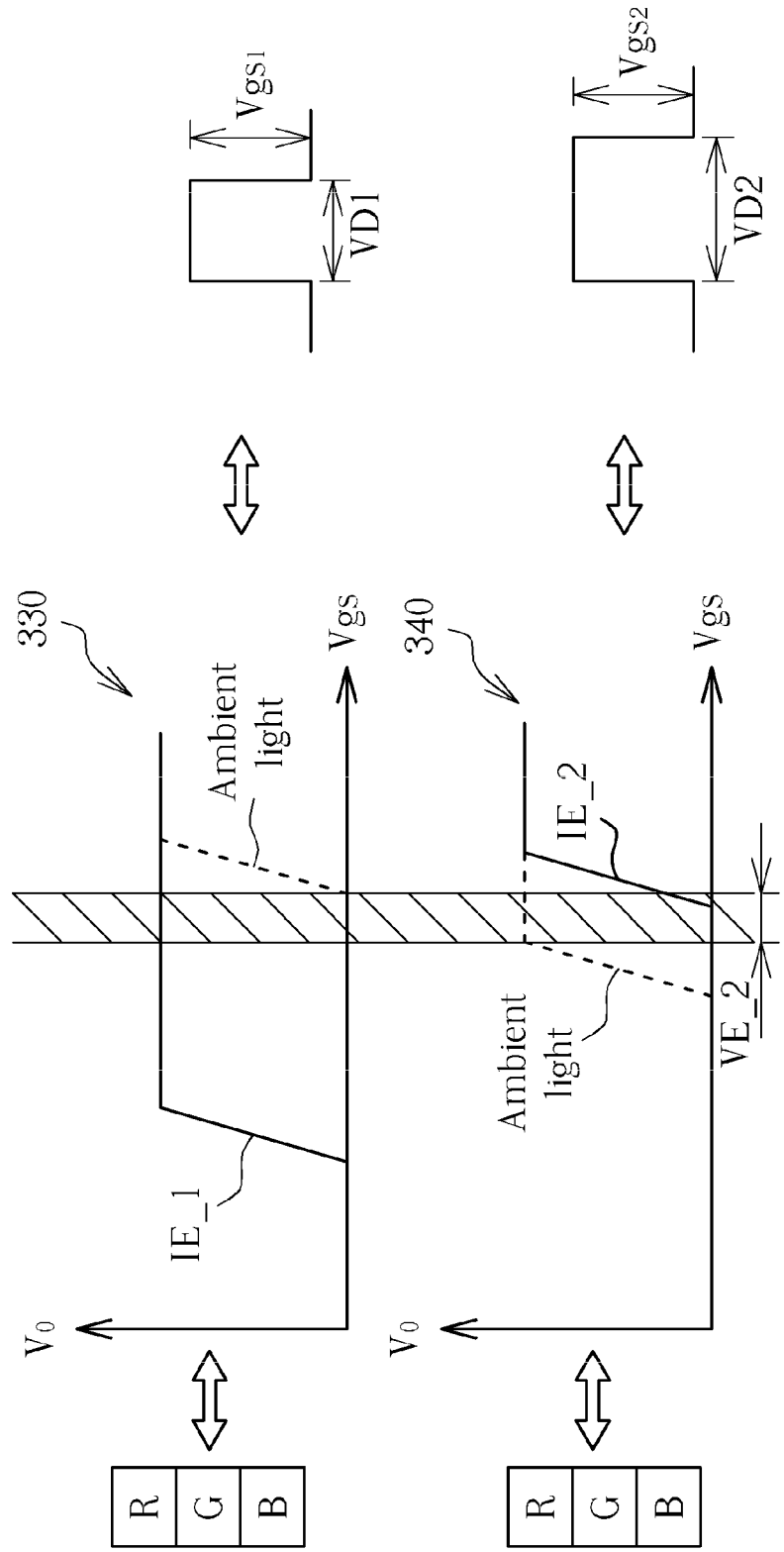
FIG. 7 is a diagram illustrating the respective relations between the biased gate-to-source voltage and the voltage signal generated due to illumination for the first and second photo sensing devices shown in FIG. 3 according to an exemplary implementation of the present invention.

In another embodiment, the different light sensing abilities between the first and second photo sensing devices 330 and 340 may be implemented by setting a driving setting of a first sensing circuit included in the first photo sensing device 330 to be different from a driving setting of a second sensing circuit included in the second photo sensing device 340. Please refer to FIG. 7, which is a diagram illustrating the respective relations between the biased gate-to-source voltage Vgs and the voltage signal Vo generated due to illumination for the first and second photo sensing devices 330 and 340 shown in FIG. 3 according to an exemplary implementation of the present invention. In this exemplary implementation shown in FIG. 7, the first and second photo sensing devices 330 and 340 have the same filter set and conventional PPS design (e.g., the first sensing circuit 432 as shown in FIG. 6A), and the major difference therebetween is that a first driving setting of a first sensing circuit included in the first photo sensing device 330 sets a first voltage difference Vgs1 to drive the first sensing circuit, while a second driving setting of a second sensing circuit included in the second photo sensing device 340 sets a second voltage difference Vgs2, which is different from the first voltage difference Vgs1, to drive the second sensing circuit. Therefore, there is sufficient difference in light sensing abilities between the first and second photo sensing devices 330 and 340, and a proper bias range VE_2 may still be found. In another alternative design, rather than changing the voltage difference for driving the sensing circuit, the same objective may be achieved by configuring the driving setting of the first sensing circuit to drive the first sensing circuit during a first driving period VD1, and configuring the driving setting of the second sensing circuit to drive the second sensing circuit during a second driving period VD2 different from the first driving period VD1. Due to the different lengths of time periods for the first and second photo sensing devices 330 and 340 to receive illumination, induced photocurrents may be different even if the above two photo sensing devices are driven by the same voltage difference. Therefore, the different light sensing abilities between two photo sensing devices may be realized.

Please refer to FIG. 8A and FIG. 8B. Each of FIG. 8A and FIG. 8B is a diagram illustrating a plurality of first and second photo sensing devices LS1 and LS2 arranged on the bottom substrate 320 according to an embodiment of the present invention. After the first and second photo sensing devices LS1 and LS2 detect the first and second type input events, voltage signals generated due to the detection are transmitted to the backend circuit for further processing. Therefore, as long as a proper configuration for signal transmission is employed, the backend circuit may identify which photo sensing devices included in the first and second photo sensing devices LS1 and LS2 generate the transmitted voltage signals. The first and second photo sensing devices LS1 and LS2 may thus be arranged arbitrarily on the bottom substrate 320. Similarly, when at least one kind of photo sensing devices of the first and second photo sensing devices LS1 and LS2 has filter sets (e.g., the red filter R, the green filter G, and the blue filter B) and no filter set (or colorless filter sets), the filter sets may also be arranged arbitrarily below the upper substrate 310.

Figures 9, 10:
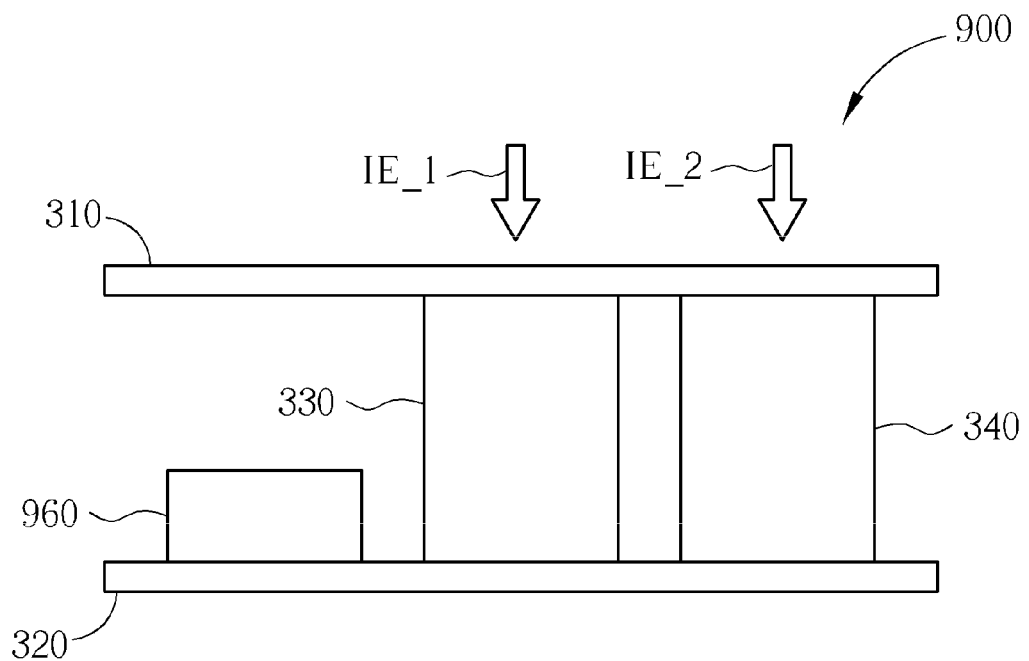
FIG. 9 is a diagram illustrating another exemplary photo-sensor type input apparatus according to another embodiment of the present invention.
FIG. 10 is a diagram illustrating data read out by the photo-sensor type input apparatus shown in FIG. 9 during different frames.

As described in the above paragraphs, the proposed first photo sensing device is dedicated to detecting a received first type input event, the proposed second photo sensing device is dedicated to detecting a received second type input event, and the light sensing abilities of the two proposed photo sensing devices are different. Therefore, when the first and second type input events occur simultaneously in the proposed photo-sensor type input apparatus, the proposed first and second photo sensing devices may successfully detect the first and second type input events, simultaneously. In another embodiment, switching operation may be employed to detect the first and second type input events, simultaneously. Please refer to FIG. 9, which is a diagram illustrating another exemplary photo-sensor type input apparatus according to another embodiment of the present invention. The photo-sensor type input apparatus 900 is based on the architecture of the photo-sensor type input apparatus 300 shown in FIG. 3, and further includes a switch unit 960. The switch unit 960 is coupled to the first and second photo sensing devices 330 and 340, and arranged for generating a switch signal SC to enable one of the first and second photo sensing devices 330 and 340. Please refer to FIG. 10, which is a diagram illustrating data read out by the photo-sensor type input apparatus 900 shown in FIG. 9 during different frames. By way of example, as shown in FIG. 10, the photo-sensor type input apparatus 900 may use the switch unit 960 to read out one of the transmitted voltage signals of the first and second photo sensing devices LS1 and LS2 during odd frames, and read out the other of the transmitted voltage signals of the first and second photo sensing devices LS1 and LS2 during even frames. As mentioned above, the arrangement of the first and second photo sensing devices LS1 and LS2 is not limited to the arrangement shown in FIG. 10.

Figure 11:
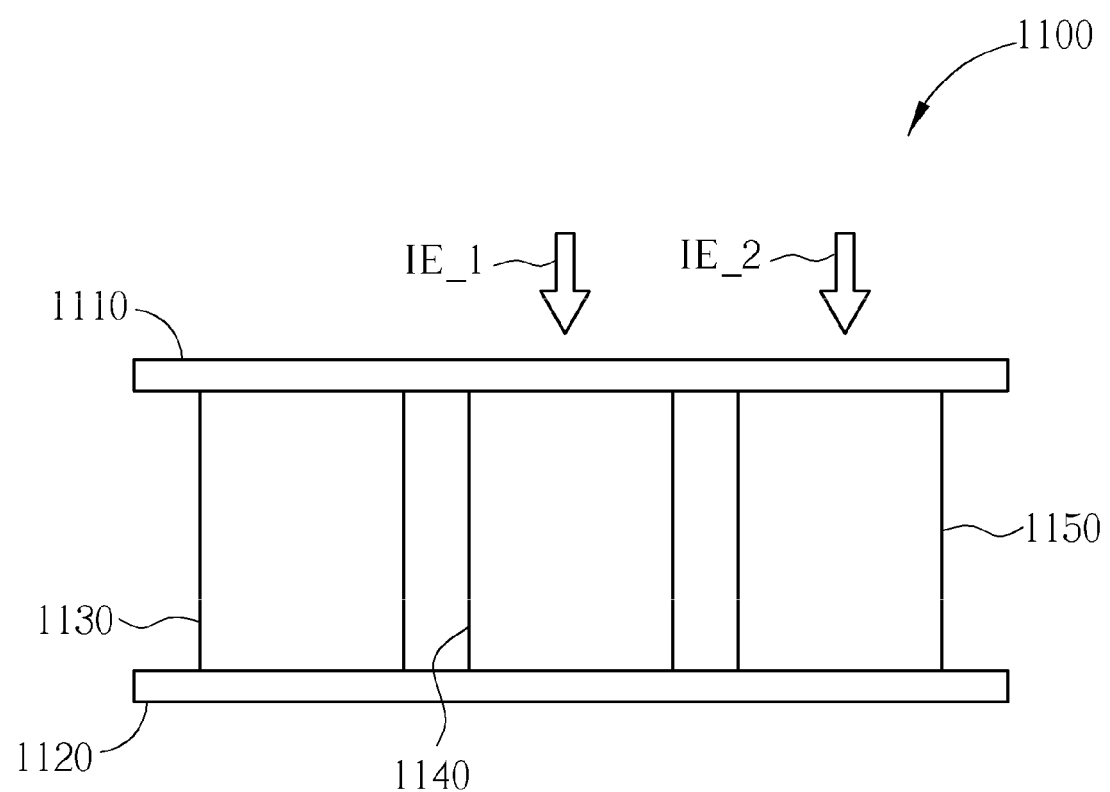
FIG. 11 is a diagram illustrating an exemplary display apparatus employing the proposed photo-sensor type input apparatus according to an embodiment of the present invention.

Please refer to FIG. 11, which is a diagram illustrating an exemplary display apparatus 1100 employing the proposed photo-sensor type input apparatus according to an embodiment of the present invention. The exemplary display apparatus 1100 includes an upper substrate 1110, a bottom substrate 1120, at least one display unit 1130, at least one first photo sensing device 1140, and at least one second photo sensing device 1150. The bottom substrate 1120 is correspondingly disposed below the upper substrate 1110. The display unit 1130 is disposed on the bottom substrate 1120. The first photo sensing device 1140 is disposed on the bottom substrate 1120 and dedicated to detecting a received first type input event IE_1. The second photo sensing device 1150 is disposed on the bottom substrate 1120 and dedicated to detecting a received second type input event IE_2. A light sensing ability of the first photo sensing device 1140 is different from a light sensing ability of the second photo sensing device 1150. As a person skilled in the operational principle of the conventional display apparatus can readily understand the operational principle of the display apparatus 1100 after reading above paragraphs directed to FIGS. 3-10, further description is omitted here for brevity.

Please note that the aforementioned implementations for adjusting/changing the light sensing ability of the photo sensing device are for illustrative purposes only, and are not meant to be limitations of the present invention. For example, the light sensing ability may also be adjusted/changed by changing the physical structure of the photo sensing device to increase/decrease the received light intensity, or fabricating different photo sensing devices by utilizing different materials. To sum up, the present invention provides two kinds of photo sensing devices having different light sensing abilities to identify different types of input events, wherein the two kinds of photo sensing devices are dedicated to detecting two types of input events, respectively. The implementation of the photo sensing devices may employ the arrangement of the color filters, the adjustment of circuit design of the sensing circuit, and the adjustment of the driving setting. Therefore, the objective of successfully detecting the input events triggered by the light pen touch and the finger touch simultaneously may be achieved, which further improves the reliability of signal identification and makes the mass production much easier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photo-sensor type input apparatus, comprising:
an upper substrate;
a bottom substrate, correspondingly disposed below the upper substrate;
at least one first photo sensing device, disposed on the bottom substrate, wherein each first photo sensing device comprises:
a first sensing circuit, for detecting a received first type input event; and
at least one second photo sensing device, disposed on the bottom substrate, wherein each second photo sensing device comprises:
a second sensing circuit, for detecting a received second type input event, wherein a circuit topology of the first sensing circuit is different from a circuit topology of the second sensing circuit;
wherein one of the first sensing circuit and the second sensing circuit comprises:
a first transistor, having a first control node and a first connection node;
a second transistor, having a second control node, a second connection node and a third connection node, wherein the first control node is coupled to the third connection node, the first connection node is coupled to the second connection node, and the one of the first sensing circuit and the second sensing circuit is biased by a voltage difference between the second control node and the third connection node; and
a capacitor, having a first end coupled to the first connection node and the second connection node;
wherein a light sensing ability of the first photo sensing device is different from a light sensing ability of the second photo sensing device; and a bias setting of each of the first photo sensing device and the second photo sensing device is within a bias range obtained from a first relation between a bias voltage and an output voltage of the first photo sensing device and a second relation between a bias voltage and an output voltage of the second photo sensing device.

2. The photo-sensor type input apparatus of claim 1, wherein when the first type input event and the second type input event occur simultaneously, the first photo sensing device and the second photo sensing device detect the first type input event and the second type input event respectively.

3. The photo-sensor type input apparatus of claim 1, further comprising:
a switch unit, coupled to the first photo sensing device and the second photo sensing device, for generating a switch signal to enable one of the first photo sensing device and the second photo sensing device.

4. The photo-sensor type input apparatus of claim 1, wherein the first type input event is an illumination touch event triggered by a light-emitting object, and the second type input event is a shadow touch event triggered by a light-shielding object.

5. The photo-sensor type input apparatus of claim 1, wherein transmittance between the first sensing circuit of the first photo sensing device and the upper substrate is different from transmittance between the second sensing circuit of the second photo sensing device and the upper substrate.

6. The photo-sensor type input apparatus of claim 5, wherein each first photo sensing device further comprises:
a filter set, disposed between the first sensing circuit and the upper substrate, wherein the filter set has at least one filter;
wherein there is no filter disposed between the second sensing circuit and the upper substrate.

7. The photo-sensor type input apparatus of claim 6, wherein the filter set has a plurality of different kinds of filters.

8. The photo-sensor type input apparatus of claim 5, wherein each first photo sensing device further comprises:
a first filter set, disposed between the first sensing circuit and the upper substrate, wherein the first filter set has at least one filter; and
each second photo sensing device further comprises:
a second filter set, disposed between the second sensing circuit and the upper substrate, wherein the second filter set has at least one filter, and transmittance of the second filter set is different from transmittance of the first filter set.

9. The photo-sensor type input apparatus of claim 8, wherein at least one of the first filter set and the second filter set has a plurality of different kinds of filters.

10. The photo-sensor type input apparatus of claim 1, wherein a driving setting of the first sensing circuit included in the first photo sensing device is different from a driving setting of the second sensing circuit included in the second photo sensing device.

11. The photo-sensor type input apparatus of claim 10, wherein the driving setting of the first sensing circuit sets a first voltage difference to drive the first sensing circuit, and the driving setting of the second sensing circuit sets a second voltage difference different from the first voltage difference to drive the second sensing circuit.

12. The photo-sensor type input apparatus of claim 10, wherein the driving setting of the first sensing circuit is configured to drive the first sensing circuit during a first driving period, and the driving setting of the second sensing circuit is configured to drive the first sensing circuit during a second driving period different from the first driving period.

13. A display apparatus, comprising:
an upper substrate;
a bottom substrate, correspondingly disposed below the upper substrate;
at least one display unit, disposed on the bottom substrate;
at least one first photo sensing device, disposed on the bottom substrate, wherein each first photo sensing device comprises:
a first sensing circuit, for detecting a received first type input event; and
at least one second photo sensing device, disposed on the bottom substrate, wherein each second photo sensing device comprises:
a second sensing circuit, for detecting a received second type input event, wherein a circuit topology of the first sensing circuit is different from a circuit topology of the second sensing circuit;
wherein one of the first sensing circuit and the second sensing circuit comprises:
a first transistor, having a first control node and a first connection node;
a second transistor, having a second control node, a second connection node and a third connection node, wherein the first control node is coupled to the third connection node, the first connection node is coupled to the second connection node, and the one of the first sensing circuit and the second sensing circuit is biased by a voltage difference between the second control node and the third connection node; and
a capacitor, having a first end coupled to the first connection node and the second connection node;
wherein a light sensing ability of the first photo sensing device is different from a light sensing ability of the second photo sensing device; and a bias setting of each of the first photo sensing device and the second photo sensing device is within a bias range obtained from a first relation between a bias voltage and an output voltage of the first photo sensing device and a second relation between a bias voltage and an output voltage of the second photo sensing device.

14. The display apparatus of claim 13, wherein transmittance between the first sensing circuit of the first photo sensing device and the upper substrate is different from transmittance between the second sensing circuit of the second photo sensing device and the upper substrate.

15. The display apparatus of claim 14, wherein each first photo sensing device further comprises:
a filter set, disposed between the first sensing circuit and the upper substrate, wherein the filter set has at least one filter;
wherein there is no filter disposed between the second sensing circuit and the upper substrate.

16. The photo-sensor type input apparatus of claim 1, wherein the bias voltage of the first photo sensing device is a gate-to-source voltage of the first photo sensing device; the output voltage of the first photo sensing device is a voltage signal generated from the first photo sensing device due to illumination; the bias voltage of the second photo sensing device is a gate-to-source voltage of the second photo sensing device; the output voltage of the second photo sensing device is a voltage signal generated from the second photo sensing device due to illumination.

17. The photo-sensor type input apparatus of claim 16, wherein the voltage signal generated from the first photo sensing device due to illumination includes a voltage generated while the first type input event is triggered and a voltage generated while the first type input event is not triggered; and the voltage signal generated from the second photo sensing device due to illumination includes a voltage generated while the second type input event is triggered and a voltage generated while the second type input event is not triggered.

18. The display apparatus of claim 13, wherein the bias voltage of the first photo sensing device is a gate-to-source voltage of the first photo sensing device; the output voltage of the first photo sensing device is a voltage signal generated from the first photo sensing device due to illumination; the bias voltage of the second photo sensing device is a gate-to-source voltage of the second photo sensing device; the output voltage of the second photo sensing device is a voltage signal generated from the second photo sensing device due to illumination.

19. The display apparatus of claim 18, wherein the voltage signal generated from the first photo sensing device due to illumination includes a voltage generated while the first type input event is triggered and a voltage generated while the first type input event is not triggered; and the voltage signal generated from the second photo sensing device due to illumination includes a voltage generated while the second type input event is triggered and a voltage generated while the second type input event is not triggered.

* * * * *